(No Model.)

G. E. HATCH.
SECONDARY BATTERY.

No. 585,472. Patented June 29, 1897.

Witnesses:
F. D. Goodwin
Will. A. Barr

Inventor:
George E. Hatch
by his Attorneys
Howson & Howson

THE NORRIS PETERS CO., PHOTO-LITHO., WASHINGTON, D. C.

UNITED STATES PATENT OFFICE.

GEORGE E. HATCH, OF QUINCY, MASSACHUSETTS, ASSIGNOR OF THREE-FOURTHS TO JAMES P. CLARE, OF SAME PLACE, AND JACOB E. RIDGWAY, OF PHILADELPHIA, PENNSYLVANIA.

SECONDARY BATTERY.

SPECIFICATION forming part of Letters Patent No. 585,472, dated June 29, 1897.

Application filed April 28, 1896. Serial No. 589,446. (No model.)

*To all whom it may concern:*

Be it known that I, GEORGE E. HATCH, a citizen of the United States, and a resident of Quincy, Massachusetts, have invented certain Improvements in Secondary Batteries, of which the following is a specification.

The object of my invention is to so construct or form a secondary-battery element as to combine the excellent electrical and chemical results due to the formation of the active material by the Planté method with the cheapness and increased capacity which follows the formation of the active material in accordance with the methods of Faure and Brush. This object I attain in the manner hereinafter set forth, reference being had to the accompanying drawings, in which—

Figure 1:
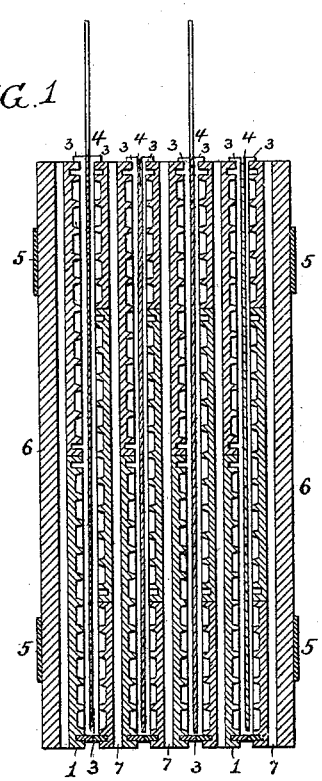
Figure 3:
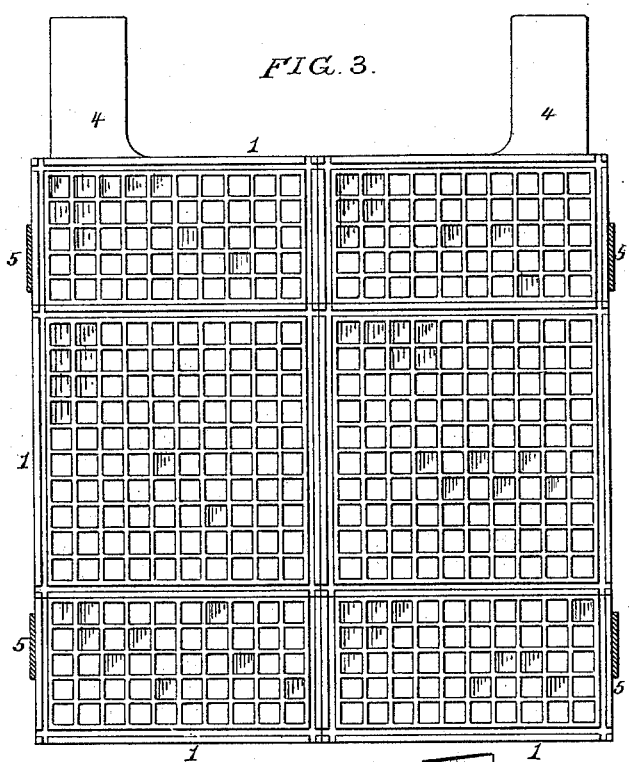
Figure 2:
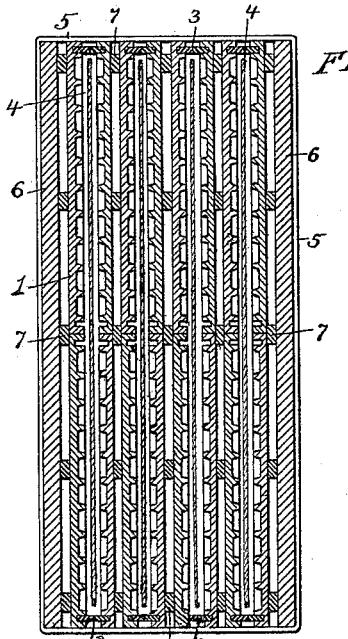
Figure 4:
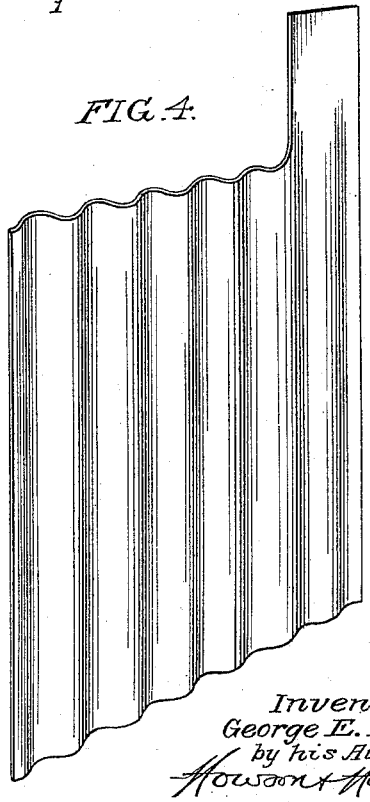

Figure 1 is a vertical section of a secondary battery of four elements constructed in accordance with my invention. Fig. 2 is a sectional plan view of the same. Fig. 3 is a face view of one of the sectional porous plates constituting part of each element, and Fig. 4 is a view of a special form of conducting plate or electrode.

The method of autogenous formation of active material upon the conducting plate or element of a secondary battery by the electrolytic decomposition of the metal of the plate itself, as adopted by Planté, gives the best electrical and chemical results, but is regarded as commercially impracticable because of the expenditure of time and current necessary when this method of formation is adopted. Modern secondary batteries therefore are made in accordance with the plan of Faure or Brush, which consists in mechanically applying metallic oxid to the conductor or electrode either in the form of a paste, paint, or cement or in the form of a powder pressed upon or into the electrode, so as to be self-sustaining thereon or therein, this plan very materially cheapening the battery as well as increasing its capacity. It is well known to those skilled in the art, however, that the chief objection to a secondary-battery element formed in accordance with the method of Faure or Brush has been the lack of physical agglomeration of the mechanically-applied active material with the metallic electrode, with the result that in discharging a layer of sulfate of lead is formed between the metallic lead and the active material, which injuriously affects the electrical result.

My invention has therefore been devised with the view of overcoming the objections while retaining the advantages of both of the methods of formation heretofore used and before referred to. This object I attain by first autogenously forming active material upon the metallic electrode by electrolytic decomposition of the surface of said electrode, then confining active material or material to become active in contact with the active material thus autogenously produced, and continuing the electrolytic action so as to unite the two.

The accompanying drawings show a battery composed of elements or cells especially devised for facilitating this method of manufacture, each cell or element being composed of opposite plates 1 of porous earthenware or other porous material unsusceptible to electrolytic action, each of these plates being preferably composed of sections of such size that they can be molded and burned without distortion, and such that the horizontal joints between the sections of one plate are out of line with the horizontal joints of the sections of the opposite plate of the element or of the adjoining plate of the next element, so as to prevent the risk of short-circuiting which might follow the failure to remove active material from the horizontal faces of the sections of the plate if the horizontal joints of the adjoining plates were in line with each other. Each section of each side plate of the cell has its inner face provided with recesses, pits, grooves, cells, or a like formation, the cellular formation being shown, for example, in the drawings, and the plates are grooved near the edges, so as to provide for the insertion in the bottom and side grooves of each plate of a strip 3 of comparatively thick rubber or other elastic or semielastic material unsusceptible to electrolytic action and capable of forming a water-tight joint with the strip of the opposite plate of the cell.

Instead of providing the opposite plates of each element with rubber strips meeting edge to edge a single strip may be adapted to the grooves in both plates, if desired.

The two plates of the cell in connection with the packing strip or strips 3 thus form an element of the vessel type—that is to say, they inclose a space for the reception of the electrode 4 and the electrolyte, this space, however, in my battery also serving for the reception of active material or material to become active, as hereinafter explained.

In preparing the battery any desired number of cells or elements of the character described are combined in the manner shown in Figs. 1 and 2—that is to say, they are confined by rubber bands 5, or any other available form of elastic confining medium, between flanking plates 6, of hard rubber, vulcanized fiber, acid-proof wood, or other available material, the elements being separated from each other by means of interposed strips 7 of material which may be similar to that of the plate 6, like strips also serving to separate said plates 6 from the porous plates of the end elements of the battery. The battery thus prepared and having a metallic electrode inserted into the spaces between the porous plates of each element is then immersed in a suitable electrolyte and the current applied to the electrodes, so as to effect the autogenous formation of active material by electrolytic action upon the metal of the electrodes in accordance with the Planté method, employing the well-known methods of accelerated formation until a sufficiently thick layer of active material has been produced upon the electrodes. I then proceed, preferably without interrupting the forming process, to introduce metallic oxids, preferably in the form of dry powder, into the spaces between each electrode and the porous walls of its inclosing vessel until these spaces are completely filled with the oxid, the forming process being then continued until there is a firm union of the active material thus introduced with the autogenously-formed active material upon the faces of the electrodes. By this means I am enabled to form a battery almost if not quite as cheaply as one in which the active material is mechanically applied to the electrode preparatory to the electrolytic action and at the same time I prevent or very materially reduce the tendency of the battery to form sulfate of lead between the electrode and the active material in discharging. Hence I am enabled to obtain electrical results approaching very closely those of a battery formed wholly in accordance with the Planté method.

Of course it will be evident that in carrying out my invention the form of cell, vessel, or inclosure for the electrode may be largely varied without departing from the spirit of my invention, the construction shown being adopted because of its simplicity, cheapness, and convenience.

In Figs. 1 and 2 I have shown the electrode in the form of a flat metal plate, but it may be preferable in many cases to use a waved or corrugated plate—such, for instance, as shown in Fig. 4—in order to increase the surface of the plate exposed to electrolytic action.

Having thus described my invention, I claim and desire to secure by Letters Patent—

1. The mode herein described of preparing a secondary-battery element, said mode consisting in autogenously forming a porous layer of active material from the metal of the electrode by electrolytic action, then loosely confining against the porous layer thus produced active material, or material to become active, in a granular or pulverulent condition, and continuing the electrolytic action so as to effect the union of this loosely-confined mass with the autogenously-produced porous layer on the plate, substantially as described.

2. A secondary battery consisting of a conducting-electrode and a receptacle therefor providing spaces between the electrode and the walls of the receptacle, said receptacle consisting of opposite plates having their inner faces grooved in proximity to the edges, and packing-strips inserted in said grooves into which they fit snugly so as to be laterally confined and thereby held in place when the side plates are detached from each other, substantially as described.

3. The within-described plate for supporting active material in contact with the electrodes of an electric battery, said plate having a surface recessed for the reception and retention of said active material, having in proximity to its edges grooves for the reception of packing strip or strips, which grooves extend from side to side of the plate and cross each other at the corners of said plate, substantially as described.

In testimony whereof I have signed my name to this specification in the presence of two subscribing witnesses.

GEO. E. HATCH.

Witnesses:
FRANK E. BECHTOLD,
JOS. H. KLEIN.